Aug. 26, 1969

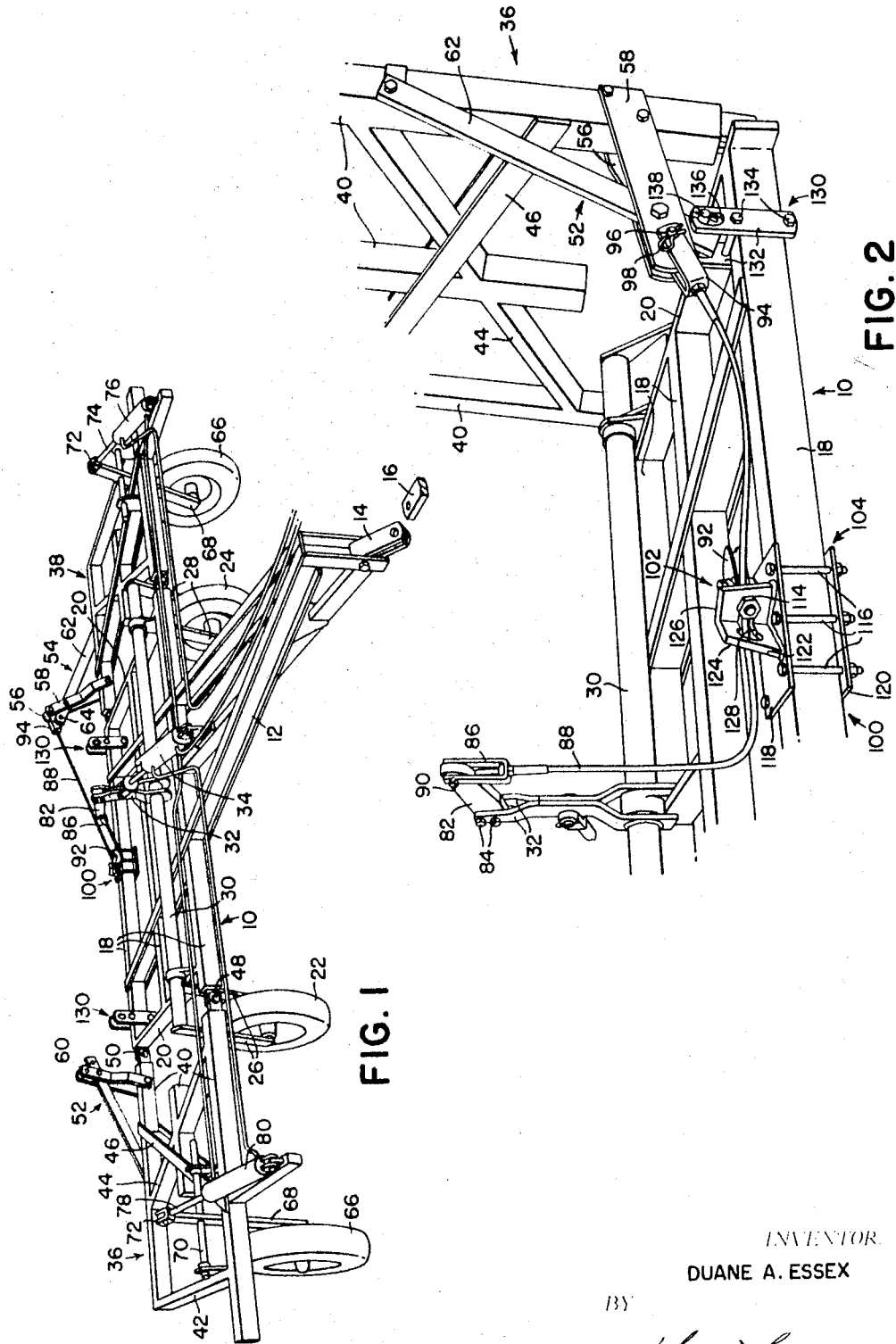

D. A. ESSEX 3,463,241

MECHANISM FOR RAISING AND LOWERING OUTRIGGER
FRAMES ON IMPLEMENT CARRIERS

Filed Sept. 11, 1967

INVENTOR.
DUANE A. ESSEX

BY

*John C. Thompson*
ATTORNEY

United States Patent Office 3,463,241
Patented Aug. 26, 1969

3,463,241
MECHANISM FOR RAISING AND LOWERING OUTRIGGER FRAMES ON IMPLEMENT CARRIERS
Duane Arnold Essex, Des Moines, Iowa, assignor to Deere & Company, Moline, Ill., a corporation of Delaware
Filed Sept. 11, 1967, Ser. No. 666,873
Int. Cl. A01b 63/14, 65/00; B62d 53/00
U.S. Cl. 172—311                                                4 Claims

ABSTRACT OF THE DISCLOSURE

A mechanism for raising and lowering pivotally mounted outrigger frames on an implement carrier, utilizing a single cable, one end of which is attached to an arm on the ground wheel supporting rockshaft and movable by the same cylinder used to control the height of the implement relative to the ground, and the other end of which is alternately securable to lift arms rigidly attached to the outrigger frames. The cable is suported by a single sheave mounted on the implement frame and adjustable between right-hand and left-hand positions to accommodate raising and lowering of the respective outrigger frame.

Background of the invention

This invention relates to agricultural implements, and more specifically to a mechanism for raising and lowering outrigger frames pivotally mounted on the outer ends of an agricultural implement carrier frame.

The present invention is an improvement over the device which is the subject of copending U.S. application Ser. No. 577,849, filed Sept. 8, 1966, and now abandoned.

Summary of the invention

A principal object of the present invention is to provide an agricultural implement carrier comprising a main frame, a pair of outrigger frames pivotally secured to the outer ends of the main frame, ground-engaging wheel means controlled by a plurality of hydraulic cylinders for adjusting the height of the implement carrier relative to the ground, and an improved cable and sheave mechanism for raising and lowering the pivoted outrigger frames relative to the main frame.

It is another object of the present invention to provide an agricultural implement carrier of the above type with a lifting mechanism which utilizes a single cable and sheave, and the hydraulic cylinder which is also used for raising and lowering the implement main frame relative to the ground.

It is a further object of the present invention to provide a lifting mechanism for the outrigger frames of an implement carrier which is simple and reliable in operation and low in cost.

These and other objects and advantages of this invention will be apparent to those skilled in the art after a consideration of the following detailed description, taken in conjunction with the accompanying drawings which illustrate the preferred form of the invention.

Brief description of the drawings

FIG. 1 is a front perspective view of an implement carrier in which this invention has been incorporated.

FIG. 2 is a rear partial perspective view showing the right outrigger frame in a raised position.

Description of the preferred embodiment

Figure 3:
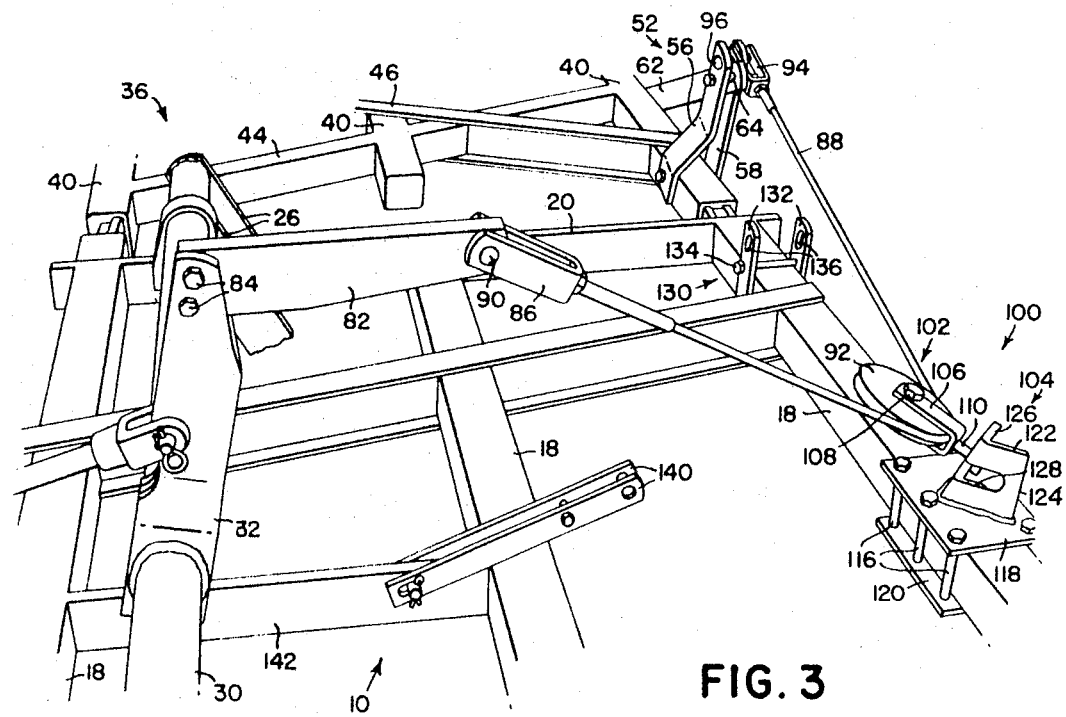
FIG. 3 is a partial perspective view from the side showing the lifting mechanism in its operating position.

In the following description, right-hand and left-hand reference is determined by standing at the rear of the implement carrier and facing the direction of travel.

The implement carrier in which the invention has been incorporated is shown in FIG. 1 and includes a main frame 10 having a forwardly extending draft frame 12 carrying a clevis 14 at its forward end which may be secured to a tractor drawbar 16. The main frame 10 includes a plurality of transversely extending toolbars 18 to which various implements, such as chisel plows, may be secured. The toolbars are interconnected by longitudinally extending side rails 20 and the rearward ends of the draft frame 12. A pair of right and left ground-engaging wheels 22, 24 are carried by downwardly extending rock arms 26, 28 which are in turn secured to the ends of a rockshaft 30. An intermediate portion of the rockshaft 28 carries upstanding rock arms 32 which are pivotally secured to an extensible and retractable double-acting cylinder 34.

The right and left outrigger frames, indicated generally at 36 and 38, respectively, are substantially identical, each including front, rear, and intermediate toolbars 40 which are interconnected by a longitudinally extending outer strap 42 and cross braces 44, 46. The outrigger frames 36, 38 are secured to the main frame 10 for pivotal movement about a longitudinally extending axis defined by front and rear pivot bolts 48, 50. Each outrigger frame has a lift arm 52, 54 rigidly mounted on the rear outrigger toolbar 40 near the pivotal connection with the main frame. The lift arms 52, 54 include side members 56 and 58 which have aligned holes 60 on their outer ends, and support arm 62 which has hole 64 on its outer end. Each outrigger frame carries its own ground-engaging wheel 66 which is carried by rock arms 68 which are rigidly mounted on a rockshaft 70, the upper end of each rock arm 68 being pivotally secured to the yoke 72 at one end of the associated piston rod of a hydraulic cylinder. The wheel carried by the left outrigger frame 38 is connected through yoke 72 and piston rod 74 with cylinder 76, and the wheel carried by the right outrigger frame 36 is interconnected through yoke 72 and piston rod 78 with the cylinder 80. As shown in FIG. 1, the three hydraulic cylinders 34, 76, and 80 are interconnected in series such that the height of the main frame and the two outrigger frames relative to the ground may be simultaneously controlled.

As seen best in FIGS. 2 and 3, a rearwardly extending arm 82 is rigidly attached to the upper ends of the rock arms 32 by bolts 84. A clevis 86, rigidly attached to the end of cable 88, is pivotally held by pin 90 to the rearward end of arm 82. When in operating position, the cable 88 extends downwardly and rearwardly to a sheave 92, around the sheave, and then transversely to one of the outrigger frame lift arms 52, 54. The clevis 94, rigidly attached to the end of the cable 88 opposite that of clevis 86, is alternately securable to the lift arms 52, 54 by a pin 96, which is releasably secured by a retainer pin 98. FIG. 3 shows cable 88 in its right-hand operating position, disposed to lift the right outrigger frame 36.

Figure 4:
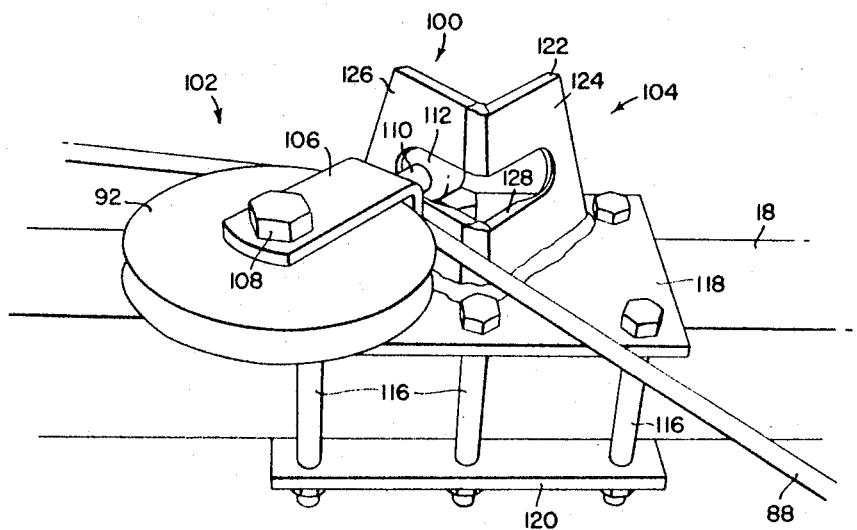
FIG. 4 is an enlarged perspective view of the novel sheave mounting bracket.

The sheave mounting bracket 100, best shown in FIG. 4, includes generally the sheave 92, a movable bracket 102, and a stationary bracket 104. The movable bracket 102 has a U-shaped end 106 in which the sheave 92 is rotatably mounted on bolt 108. A center rod 110 connects the U-shaped end 106 with a removable spherical end 112. The center rod 110, which is rigidly attached to the U-shaped end, is threaded to receive nut 114, which releasably secures the spherical end 112 to the center rod.

The movable bracket 102 is restrained by the stationary bracket 104, rigidly mounted on the rear toolbar 18 of the main frame 10, directly in line with the arm 82. Bolts 116 hold the top plate 118 and the bottom plate 120 securely to the rear toolbar 18. Rigidly mounted on the top plate 118 is a slotted, V-shaped member 122, comprised of sides 124 and 126. The two sides, which extend upwardly and rearwardly, come together in a V-shape, each side forming an angle of approximately 45° with the longitudinal centerline of the implement carrier. A horizontally elongated slot 128 is centered about the longitudinal centerline, extending for an equal distance on each side of the V-shaped member 122. The slot 128 is small enough to restrict the spherical end 112 of the movable bracket 102, but large enough to allow the center rod 110 of the movable bracket to move freely in the slot. The rounded ends of the slot 128 are chamfered to receive the spherical end 112 of the movable bracket 102 in its right-hand and left-hand operating positions.

A retaining bracket 130 is provided for each of the outrigger frames 36, 38. Each retaining bracket is composed of two arms 132 rigidly secured to the rear toolbar 18 by bolts 134. The arms 132 have slotted holes 136 on their upper ends for receiving a pin 138, which extends through the hole 64 in the lift arm of the respective outrigger frame and thus secures the outrigger frame in a raised position.

To operate the lifting mechanism, the cylinders 34, 76, and 80 must first be extended, which results in rotating the rockshafts 30, 54 and thus raising the implement carrier from the ground and moving the arm 82 rearwardly. The movable sheave bracket 102 is then moved to one of its operating positions on the ends of the slot 128, and the clevis 94 on the cable 88 is attached to the lift arm of the respective outrigger frame with pin 96. When the cable is thus secured, the cylinders 34, 76, and 80 are retracted, which results in rotating the rockshafts 30, 54, lowering the implement to the ground, and moving the arm 82 forwardly. The cylinders are retracted until the outrigger frame assumes a nearly vertical position (illustrated in FIG. 2), at which time the outrigger frame is secured by the pin 138, which extends through the hole 62 in the respective lift arm and the slots 136 in the respective outrigger frame retaining bracket 130. The cylinders 34, 76, and 80 must then be retracted before the lifting operation can be performed on the other outrigger frame. After the cylinders are retracted, it is necessary only to disconnect the cable from the lift arm of the first outrigger frame, shift the movable sheave bracket to its opposite working position, and connect the cable to the lift arm of the second outrigger frame. The second outrigger frame can then be raised and secured to its retaining bracket in the same manner as was the first outrigger. In order to lower the outrigger frames from their raised positions, the above procedure is simply reversed.

Link arms 140, as shown in FIG. 3, are pivotally mounted on longitudinal member 142 of the main frame 10 directly below arm 82. When it is desired to transport the implement carrier, clevis 86 may be removed from arm 82 and the link arms 140 swung to an upright position and secured to arm 82 by pin 90, thus rigidly holding the implement carrier in a transport position and allowing the fluid pressure in cylinder 34 to be relieved.

While only one form of the invention has been shown, it should be recognized that other forms and variations may occur to those skilled in the art without their departing basically from the broad general principles disclosed herein. Therefore, it should be understood that the present description and disclosure was given for the purposes of clearly and concisely illustrating the principles of the invention.

I claim:

1. An implement carrier for supporting earth-working tools comprising: a main frame means, a pair of outrigger frame means secured to the main frame means for pivotal movement about generally longitudinally extending axes, a plurality of ground-engaging wheel means, at least one of said wheel means being carried by each of said frame means, a plurality of extensible and retractable double-acting hydraulic cylinder means mounted on the main and outrigger frame means respectively and operable to move the wheel means relative to the frame means to raise and lower the frame means between transport and working positions, and fluid line means interconnecting said double-acting hydraulic cylinders in series, said fluid line means including a first fluid line secured to one end of the first cylinder in series, a second fluid line secured to one end of the last cylinder in series, the first and second fluid lines being connectible alternately to a source of fluid pressure in a fluid reservoir, and further fluid line means interconnecting the cylinders in series, wherein the improvement comprises cable and sheave means for pivotally moving the outrigger frames between raised and lowered positions relative to the main frame, said cable means having first and second end portions interconnectible with one of said cylinders and said outrigger frame means, respectively, whereby when said end portions are interconnected, extension and retraction of said one cylinder raises and lowers said interconnected outrigger frame means.

2. The implement carrier set forth in claim 1, in which the cable means comprises a single cable, its first end portion being mounted for longitudinal movement and its second end portion being alternately securable to either one of the pair of outrigger frame means, an intermediate portion of said cable being supported by sheave means comprising a single sheave adjustably mounted for movement between right-hand and left-hand positions.

3. An implement carrier as set forth in claim 1, further characterized by the provision of a transversely extending rockshaft journaled for rotation on the main frame means, the ground-engaging wheel means associated with said main frame means being carried by said rockshaft, the cable means comprising a single cable, the first end portion of said cable being attached to an arm rigidly secured to the ground wheel supporting rockshaft on the longitudinal centerline of the implement, said rockshaft rotatable by extension and retraction of said one cylinder, the second end portion of said cable being alternately securable to upwardly extending lift arms rigidly mounted on the outrigger frames, said cable being medianly suported by sheave means comprising a single sheave mounted in a first bracket supported for movement between right- and left-hand positions by a second bracket rigidly attached to the main frame on the longitudinal centerline of the implement rearwardly of the first end of the cable, said first bracket having a U-shaped first end for accommodating the sheave and a spherical second end attached to the first end by a middle portion of reduced cross section, said second bracket having two sides extending upwardly and rearwardly in a forwardly extending V-shape, said second bracket having a horizontally elongated slot centered on the longitudinal centerline of the implement carrier for receiving the first bracket, the height of said slot being lesser than that of the spherical end of the first bracket, but greater than the height of the middle portion of said first bracket.

4. An implement carrier for supporting earth-working tools comprising: a main frame, a pair of outrigger frames secured to the main frame for pivotal movement about a generally longitudinally extending axis, a transversely extending rockshaft journaled for rotation on the main frame, a pair of inner ground-engaging wheel means carried by said rockshaft, a pair of outer ground-engaging wheel means carried by said pair of outrigger frames, hydraulic cylinder means for raising and lowering the ground-engaging wheels relative to the frames of the implements, and cable and sheave means for pivotally moving the outrigger frames between raised and lowered positions relative to the main frame, said cable means comprising a single cable, the first end portion of said cable being attached to an arm rigidly secured to the ground wheel supporting rockshaft on the longitudinal centerline of the implement, said rockshaft rotatable by extension and retraction of said hydraulic cylinder means, the second portion of said cable being alternately securable to upwardly extending lift arms rigidly mounted on the outrigger frames, said cable being medianly supported by sheave means secured to the main frame and movable between right- and left-hand positions.

References Cited

UNITED STATES PATENTS

| 3,298,446 | 1/1967 | Anderson | 172—456 |
| 3,308,891 | 3/1967 | Jackson | 172—456 |
| 3,354,966 | 11/1967 | Jackson | 172—311 |
| 3,362,483 | 1/1968 | Twidale | 172—311 |

LEO FRIAGLIA, Primary Examiner

U.S. Cl. X.R.

172—456; 280—411